United States Patent [19]

Parker

[11] Patent Number: 4,720,629
[45] Date of Patent: Jan. 19, 1988

[54] PATTERN TRACER WITH ELECTRONIC KERF CONTROL WITH ADJUSTABLY DELAYED SAMPLING PULSE

[75] Inventor: Robert E. Parker, Dundas, Canada

[73] Assignee: Westinghouse Canada Inc., Hamilton, Canada

[21] Appl. No.: 856,404

[22] Filed: Apr. 28, 1986

[51] Int. Cl.⁴ ............................................. G05B 1/00
[52] U.S. Cl. ..................................... 250/202; 318/577
[58] Field of Search ........................ 250/202; 318/577

[56] References Cited

U.S. PATENT DOCUMENTS

Re. 30,938  5/1982  Kallen ................................. 250/202
4,396,832   8/1983  Henderson ......................... 250/202

Primary Examiner—David C. Nelms
Assistant Examiner—Chung Seo
Attorney, Agent, or Firm—E. H. Oldham

[57] ABSTRACT

In an optical pattern follower, of the rotating scanning type, in which co-ordinated drive signals are produced by sampling two co-ordinate sinusoids, an adjustable kerf off-set is provided by selectably delaying the sampling pulse.

4 Claims, 3 Drawing Figures

PATTERN TRACER WITH ELECTRONIC KERF CONTROL WITH ADJUSTABLY DELAYED SAMPLING PULSE

This invention relates to electro-optical pattern tracing systems and in particular to pattern tracing systems having what is referred to in the art as a circular scan.

PRIOR ART

In the past, there have been numerous circular scan optical pattern tracing systems which view a pattern in a circular manner and derive a signal each time the optical scanner encounters the edge of the pattern. Typical of such prior art tracers is the tracer described in U.S. Pat. No. 3,395,282 or in U.S. Pat. No. 3,883,735.

In all tracing apparatus, the tracer follows the pattern and a tool of some sort, such as a gas cutting torch, is caused to move in a manner identical to the motion of the scanner. In the operation of a cutting tool for example, a torch, a certain amount of material is removed. The width of material removed is referred to as kerf. In order that the piece which is cut shall have the same dimensions as the pattern, it is necessary that compensation be provided for the width of cut or kerf. This kerf compensation has been provided in the past, as for example in Canadian Pat. No. 917,773, by the mechanical displacement of the reference line of the scanning apparatus.

Such a mechanical adjustment has disadvantages since it requires that the operator of the tracing device manipulate the scanning head and adjust it in accordance with the desired kerf correction. It would be preferable that all such adjustments be controlled by a remote adjustment on the operator's control panel.

Canadian Pat. No. 917,773 discloses a pattern tracing system which generates a pair of sinusoids and samples these two sinusoids which are at 90° to each other with a pulse derived from the scanner electro-optical output. This pulse indicates the instant of crossing of the pattern by the scan. Sampling of the two sinusoids with a signal representing the instant of crossing of the pattern by the scan generates a pair of signals which may represent the X and Y velocities necessary to maintain the tracer over the pattern.

INVENTION

In accordance with the present invention, an adjustable delay is introduced into the sampling signal applied to the sampling circuits which sample the two coordinate sine waves. This adjustable delay permits the tracer to proceed on a path on one side or the other pattern an amount equal to the desired kerf.

DRAWINGS

A clearer understanding of the invention may be had from a consideration of the attached drawings in which.

Figure 1:
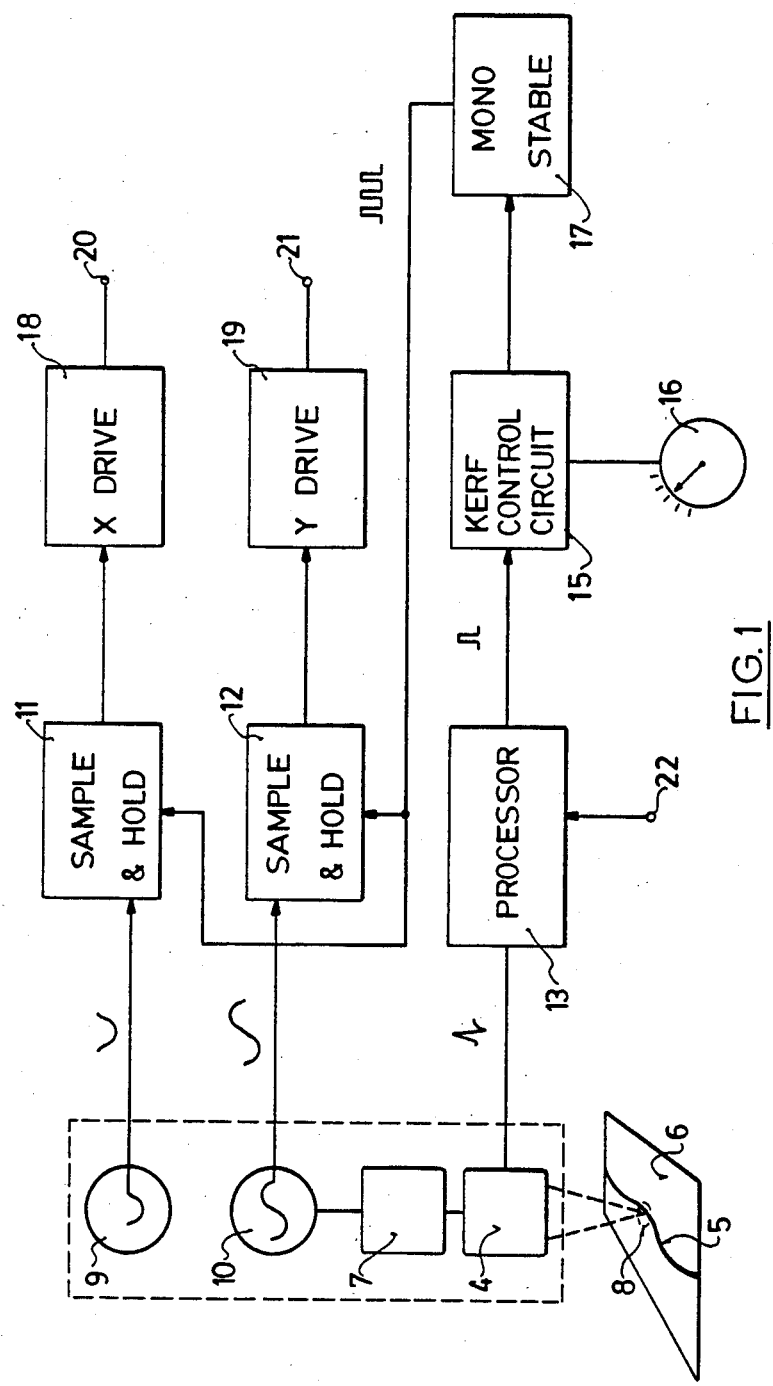
FIG. 1 is a block diagram of a system in accordance with the invention.

Considering first FIG. 1, there is shown an optical scanner of any suitable configuration which optically views a pattern 5 on a surface 6. The pattern 5 comprises an optically distinguishable mark on surface 6 for example, a black line on a white surface. The optical scanner 4 is driven in a rotary manner by a motor 7 which causes the optical scanner to scan the pattern in a circular manner as illustrated by the dotted circle on surface 6, designated 8. A pair of generators arranged to generate a pair of sinusoids at 90° with respect to each other are driven by the motor 7. These generators 9 and 10 generate sinusoids at 90° to each other or sine and cosine waves respectively. The sine and cosine waves are applied to sample and hold circuits 11 and 12. The output from the photo scanner 4 is of the form shown in FIG. 2 at C. This pulse is reshaped by processor 13 and then passed to the kerf control circuit 15. Processor 13 also receives an inhibit pulse from terminal 22. This inhibit pulse, derived in a manner described in the prior art, permits pulses to pass through the processor only during a certain time period each cycle and serves to eliminate any signal other than the desired signal. Kerf control circuit 15 is a monostable triggered by the pulse from processor 13 and has an adjustable unstable state determined by the setting control 16, which is the kerf control, and is calibrated in units of kerf displacement. The output from kerf control circuit 15 is applied to monostable 17 which produces a sampling pulse on the trailing edge of the pulse from kerf control circuit 15. This sampling pulse is applied to the sample and hold circuits 11 and 12 which causes outputs from the circuits representing the instantaneous value of the sinusoid applied to each of the two circuits at the time corresponding to the time of occurrence of the sample pulse.

These two sample and hold circuits apply their outputs to the X and Y coordinate drives, respectively designated 18 and 19, and the outputs at terminals 20 and 21 from the X and Y coordinate drive are supplied to the coordinate drive motors of the tracing system (not shown).

Figure 2:
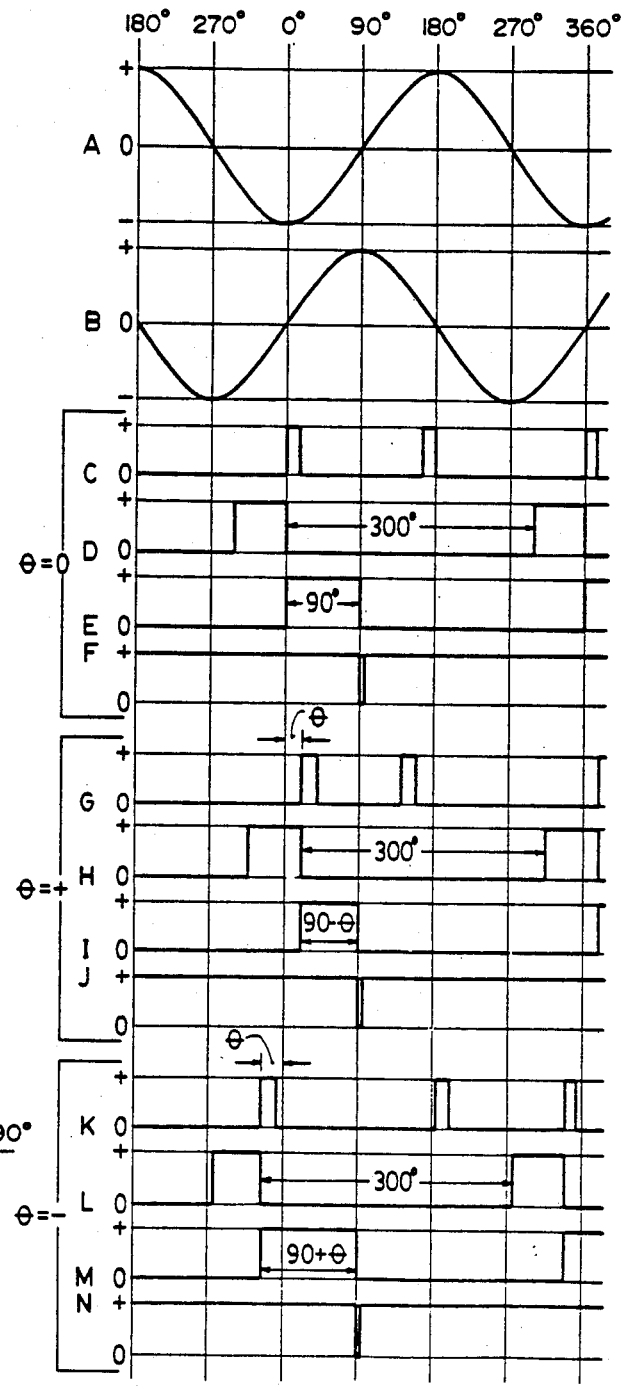
FIG. 2 is a graphical illustration of the signals at various points in the system.

Considering FIG. 2, the sinusoids generated by generators 9 and 10 are shown at A and B respectively, i.e. A is applied to sample and hold 11. The output from the photo cell scanner after shaping by processor 13 is shown at C, the inhibit pulse supplied to terminal 22 is shown at D. The pulse generated by kerf monostable 15 is shown at E. The sample signal produced in monostable 17 is shown at F. Signals G, H, I and J show the same signals when the centre of the scan is displaced as shown at 3B. Examination of the sample pulse and the reference sinusoids A and B illustrates that the output from the sample and hold circuit 12 is maximum and the output from sample and hold circuit 11 is 0 thus causing the machine to operate in the Y direction maximum velocity and X direction 0 velocity with the centre displaced as shown.

Figure 3:
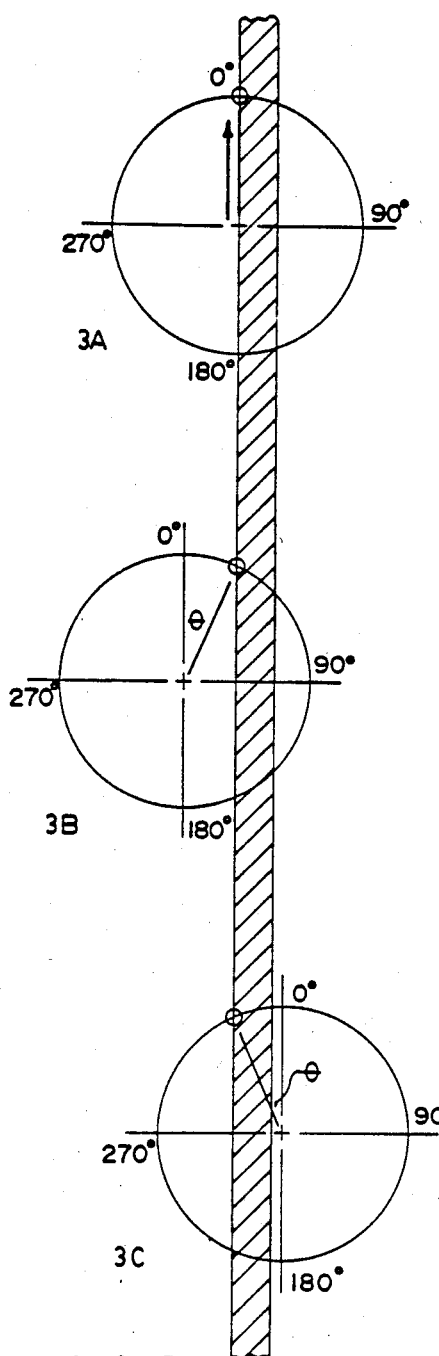
FIG. 3 is an illustration of the scanning pattern showing various kerf offsets relative to a line pattern.

Graphs K, L, M and N respectively show the same signals that is the scanner inhibit, kerf and sample pulse outputs from the system when the centre of scan is displaced as shown at 3C. The difference between FIGS. 3B and 3C is the adjustment of kerf control 16 which produces an off set to one side or the other of the edge of the pattern in accordance with the amount of delay introduced into the sample circuit by means of the kerf control.

As will be seen, the operator is able, by means of kerf control 16, to vary the delay applied to the sample signal and thus vary the position of the centre of scan with reference to the edge of the pattern. It will also be evident that the degree of displacement could be equal to the diameter of scan or lead, however, the control 16 will be limited in such a manner to permit only a limited amount of displacement, otherwise the system would become unstable or attempt to trace completely off the pattern.

While the invention has been described in association with a very simple system it will be understood that various refinements included in the prior art such as memory, adjustable frequency response, etc. can be included without interfering with the operation of this invention.

I claim:

1. In an electro optical rotating scanner pattern tracing system including means to generate a sampling pulse indicative of the position of the edge of the pattern with reference to a fore and aft axis of the optical rotating scanner and means to generate reference sinusoids representative of the rotational position of the optical scanner, a kerf control including means to apply an adjustable time delay to said sampling pulse and means to utilize said delayed sampling pulse to sample said reference sinusoids and derive coordinate velocity signals.

2. An electro optical pattern tracing system including:
   (a) a rotating optical scanner for scanning said pattern and producing a sampling pulse indicative of the scan crossing the edge of said pattern;
   (b) a pair of sinusoid generators synchronized with the rotation of said optical scanner;
   (c) means to adjustably time delay said sampling pulse;
   (d) means to utilize said sampling pulse after delay to sample the output of said sinusoid generators;
   (e) means to utilize said output samples to produce coordinate drive signals and move said system in accordance with said pattern.

3. A tracing system as claimed in claim 2 wherein said tracing system includes an X and Y coordinate drive and means to utilize said drive signals to control said X and Y coordinates drives.

4. In an electro optical circular scanning pattern tracing system including means to generate and select a sampling pulse indicative of the time of crossing the pattern edge by the circular scan, means to produce a pair of sinusoidal signals at ninety electrical degrees with reference to each other and having a frequency equal to the rotational frequency of said circular scan, kerf control means including means to adjustably time delay said sampling pulse, means to utilize said delayed sampling pulse to sample said sinusoid signals and utilize said sample to produce a pair of coordinate velocity signals, means to utilize said coordinate velocity signals to cause said tracing system to follow a path determined by said pattern but off set therefrom an amount equal to said kerf in accordance with said time delay.

* * * * *